No. 794,442. PATENTED JULY 11, 1905.
F. WRIGHT.
CONTROLLER FOR ELECTRIC MOTORS.
APPLICATION FILED FEB. 10, 1905.
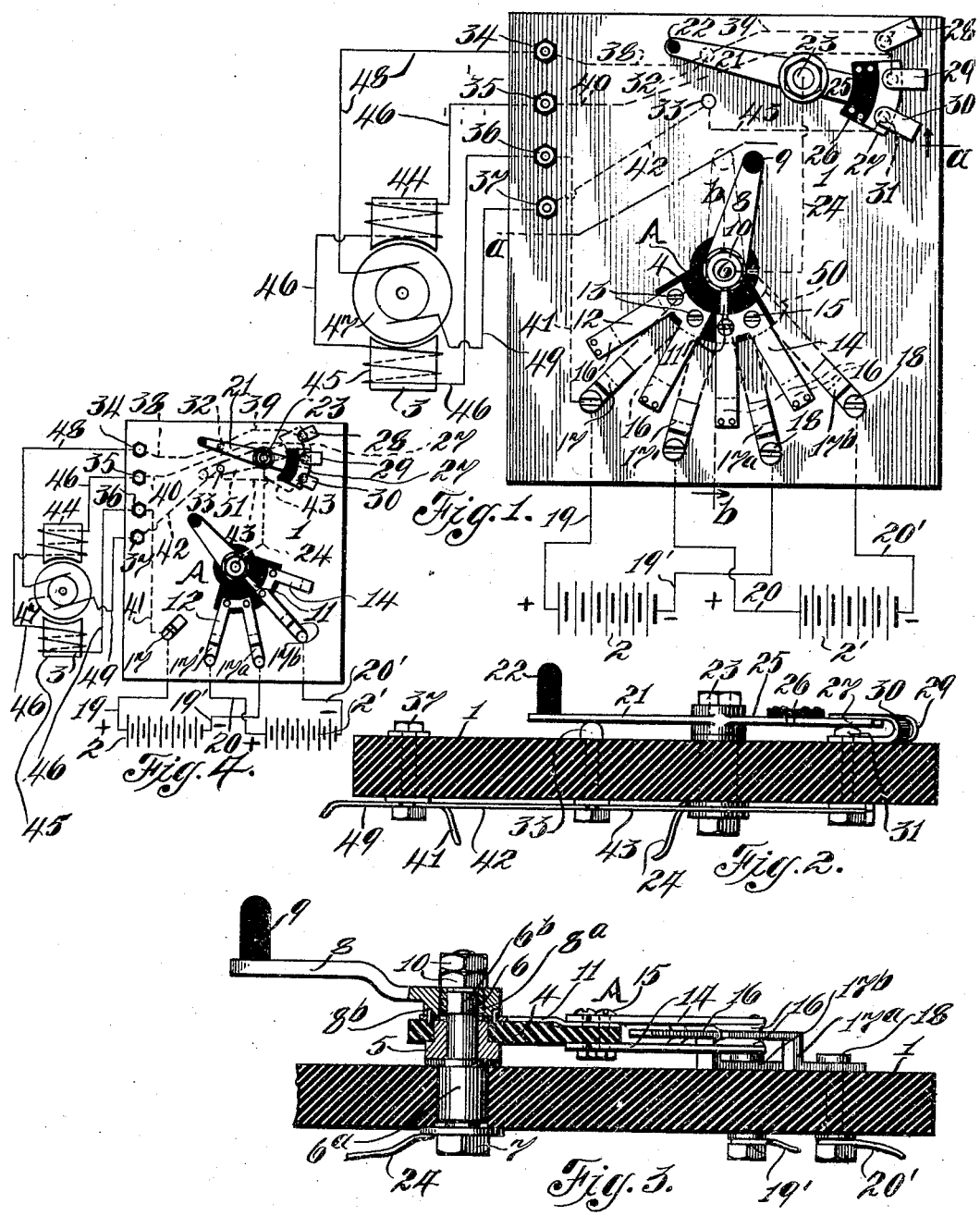
WITNESSES:
INVENTOR
Frederick Wright
BY
his ATTORNEY.

No. 794,442.

Patented July 11, 1905.

UNITED STATES PATENT OFFICE.

FREDERICK WRIGHT, OF FISHKILL, NEW YORK, ASSIGNOR OF ONE-HALF TO ADOLPH G. HUPFEL, OF NEW YORK, N. Y.

CONTROLLER FOR ELECTRIC MOTORS.

SPECIFICATION forming part of Letters Patent No. 794,442, dated July 11, 1905.

Application filed February 10, 1905. Serial No. 245,018.

*To all whom it may concern:*

Be it known that I, FREDERICK WRIGHT, a resident of Fishkill, Dutchess county, in the State of New York, have invented certain new and useful Improvements in Controllers for Electric Motors, of which the following is a specification.

This invention relates to a novel form of controller for electric motors and in connection therewith a special form of battery connection.

In my improved form of controller and connections the ordinary resistance-coils used in controllers is done away with and in their stead I by a novel arrangement throw in a greater or less amount of current, the means for so doing to be hereinafter described.

My improvement is more particularly adapted for battery energy, and in carrying my improvement into practice I connect a desired number of cells, either storage or galvanic, in series, having as many of these independent sources of energy as desired, each of these independent sources of energy being connected independently of each other with the contact-points of the controller-switch and by means of the switch throw in one of the said sources in series with the motor or two or more in series with each other and the motor. In ordinary practice the motor-controller is in series with the motor and in line of one wire only, the current being thrown through resistance-coils to get a desired speed. The choking effect of these coils causes the controller to arc at the contact-points, thus causing the said points to burn or carbonize, and so destroy the conducting effect. The absence of coils in my device greatly decreases the arcing, thereby saving the apparatus. Another point of difference in my device is that I carry the current through the fields back to the controller, then through the armature, through the brushes to the controller-switch, and then to the source of energy, this being for a definite purpose to be hereinafter described. I also mount, if desired, upon the base of the controller a reversing-lever or pole-changer, which may be mounted anywhere off the base and operate equally as well.

To these and other ends, which will hereinafter appear, the invention comprises the novel features of improvement and combination and arrangement of parts, which will be hereinafter set forth, and finally pointed out in the appended claims.

Reference is to be had to the accompanying drawings, forming part of this specification, wherein—

Figure 1 is a plan view of my improvements with a motor, shown diagrammatically, connected thereto. Fig. 2 is an enlarged cross-section thereof, taken on a line $a\,a$ in Fig. 1 and looking in the direction of the arrow. Fig. 3 is a longitudinal section, also enlarged, of a portion of my device, taken on a line $b\,b$ in Fig. 1 and looking in the direction of the arrow; and Fig. 4 is a plan view of my device, on a reduced scale, showing the position of the switch when full power is turned on, also showing in dotted lines the pole-changing switch in position for reversal.

Like characters of reference indicate corresponding parts in the several views.

Referring to the accompanying drawings, the numeral 1 indicates the base of my device, which is made of some non-conducting material, such as slate or the like. In this instance two independent sources of energy 2 and 2' are shown, each of which may be composed of a plurality of unit members in series. The device may be equipped with more than two sources of energy, if desired. A motor, diagrammatically illustrated, is indicated by 3. The foundation member 4 of the switch A is formed of non-conducting material, such as fiber, it being rigidly secured to a revoluble thimble 5, Fig. 4, which is rotatably mounted upon a spindle 6 integral with the plug $6^a$, which in turn is securely fastened to the base 1 by means of the nut 7. For the purpose of operating the switch I provide in this instance a handle or lever 8, provided with a knob 9, of non-conducting material. The handle 8 is provided with a bushing $8^a$, which is fitted to the squared portion $6^b$ of the spindle 6 and is free to rotate upon the said bushing, motion being communicated to the switch A by means of the dowel-pins $8^b$ and is held in place by the nuts 10. Between the handle 8 and thimble 5 I interpose a conductor 11, which will be securely held against said thimble when the nuts 10 are screwed home and is for a purpose to be hereinafter explained. To the member 4 I fasten fork-shaped metallic contact brushes or fingers in pairs, there being in this instance two sets, one pair, 12, being secured by the bolts 13 and the other pair, 14, being secured by the bolts 15, the conductor 11 connecting the set 14 with the thimble 5, the set 12 not having any connection with said thimble. The contact-fingers 12 and 14 are preferably sufficiently thin to permit of a certain amount of springiness. To the outer ends of said fingers I secure copper contacts 16, which contacts are adapted to grasp the contacts 17 17' 17ª 17ᵇ, which are secured to the base 1 by the bolts 18, and to the said bolts and upon the bottom of the base are connected the wires 19 19' and 20 20'. The positive and negative wires 19 and 19', respectively, connect the source of energy 2 with the contacts 17 and 17ª, and the positive and negative wires 20 20', respectively, connect the source of energy 2' with the contacts 17' and 17ᵇ. It will thus be seen that the two sources of energy 2 2' are normally independent of each other.

At a convenient point upon the base 1 I place a reversing-lever or pole-changer 21, which is provided with a non-conducting operating-knob 22, said lever being pivotally secured to the base 1 by the spindle 23 in a manner described for the switch member 4. The lever 21 is made of a conducting material and is in circuit through the spindle 23 with the spindle 6 of the switch by means of a conductor 24, said conductor being a wire or metallic strip. Upon the end 25 of the lever 21 I secure a block 26 of non-conducting material, and to this block I secure a copper knife-contact 27, said contact 27 having no metallic connection with the lever 21, the contact 27 being adapted to close the circuit between the spring-contacts 28 29 30, which are secured to the base 1 by the bolts 31, the heads of said bolts acting in conjunction with the contacts 28 29 30 to complete the necessary circuits.

Upon the base 1 I place, convenient to the lever 21, contacts 32 and 33, which are adapted to be contacted by said lever. Also upon the base 1 I place binding-posts 34 35 36 37, the post 34 being in circuit with the contact 32 and spring-contact 28 through the conductors 38 and 39, the post 35 being in circuit with the spring-contact 29 through the conductor 40, the post 36 being in circuit with the switch-contact 17 through the conductor 41, and the post 37 being in circuit with the contact 33 and spring-contact 30 through the conductors 42 and 43. The fields 44 and 45 of the motor 3 are in circuit with the posts 35 and 36 through the wire 46, and the armature 47 of the motor 3 is in circuit with posts 34 and 37 through the wires 48 and 49.

As the drawings fully illustrate an electrically-operative combination, detailed reference thereto has been avoided. The dotted position 50 of the switch shown in Fig. 1 shows the said switch in the position it would assume for half-speed of motor, and the dotted lines 51 in Fig. 4 show the reverse-lever 21 in a position for the reversal of the motor, which will be hereinafter explained.

The operation will now be described, starting with half-speed of the motor, as illustrated by dotted lines 50, Fig. 1: When in this position, the fingers 12 will be in contact with the contacts 17 17'. This will throw the two positive wires 19 and 20 of the sources of energy 2 2' in circuit with the conductor 41, and the current will flow as follows: through the conductor 41 to post 36, through wires 46 (around fields 44 and 45) to post 35, through conductor 40 to spring-contact 29, through knife-contact 27 to spring-contact 30, through conductors 43 and 42 by way of the contact 33 to post 37, through wire 49, through armature 47, through wires 48 to post 34, through conductor 38 to contact 32, through lever 21 to spindle 23, through conductor 24 to spindle 6, into thimble 5, through conductor 11 to fingers 14, which being in contact with the contacts 17ª and 17ᵇ will throw the current through the negative wires 19' and 20' into the sources of energy 2 2'. By this arrangement it will be seen that the two positive poles and the two negative poles of the sources of energy 2 2' are connected in multiple. Consequently about one-half of the electrical energy is drawn therefrom.

Referring to Fig. 4, the operation of full speed will be explained. In this figure only the wires and contacts which are necessary for full speed are lettered to avoid confusion. It will be seen that for full speed the switch A is thrown over, so as to bring the fingers 12 in contact with the contacts 17' and 17ª and one of the fingers 14 in contact with the contact 17ᵇ. It will also be seen that this position throws the sources of energy 2 2' in series with each other, thereby getting the full extent of their output. The current will flow as follows: As the fingers 12 are in contact with the positive contact 17' of the source 2' and the negative contact 17ª of the source 2, they form part of the circuit between said two sources. As this accomplishes a series connection, (as has been stated,) the current will flow through wire 19, through conductor 41 to post 36, over wires 46, (around fields 44 and 45) to post 35, through conductor 40 to contact 29, through knife-contact 27 to post 30, through conductors 43 and 42 to post 37, through armature by way of the wires 49 and 48 to post 34, through conductors 38 to lever 21, to spindle 23, through conductor 24 to spindle 6 through conductor 11, to fingers 14 through contact 17ᵇ to the negative pole of source 2' by way of the wire 20'. It has been shown that the sources of energy 2 2' can be connected in multiple or in series at will, thus regulating the speed of the motor without the aid of resistance-coils.

A reversal is accomplished in the following manner: Referring to position 51, Fig. 4, it will be seen that the knife-contact 27 has been shifted to connect the contacts 28 29 and lever 21 is in contact with the contact 33, the current flowing as follows, the switch being positioned for full speed, as has just been explained: over conductor 41 to post 36 (around fields 44 and 45) through the wire 46 to post 35, through conductor 40 to spring-contact 29, through knife-contact 27 to spring-contact 28, through conductors 39 and 38 to post 34, over wire 48 through armature 47 to wire 49, to post 37, through conductor 42 to contact 33, through lever 21 to spindle 23, through conductor 24 to source of supply.

It has now been shown that for forward motion the lever 21 causes the current to flow through the armature in the proper direction, (assuming that the flow from the conductor 49 to 48 is the proper one) and by altering the position of the lever the current is caused to flow from 48 to 49, thus changing the direction of flow, and consequently reversal is accomplished.

The device herein illustrated and described is adapted for any purpose where motors are used, be it factory, automobile, or marine usage, and is not limited to manual manipulation, as any suitable connection with the switch and reverse levers may be employed.

By my improved means energy is conducted directly from the source of energy to the motor. In the following claims the term "directly" is intended to indicate the absence of resistance-coils.

Having now described my invention, what I claim, and desire to secure by Letters Patent, is—

1. In combination with a motor, a switch consisting of a member of non-conducting material pivotally supported by a suitable spindle, a set of brush-contacts carried by said member and independent of said spindle, said brush-contacts being electrically connected, a second set of brush-contacts carried by said member and electrically connected with said spindle and each other, a plurality of secondary contacts in proximity to said brush-contacts, a plurality of sources of energy independently connected to said secondary contacts, and means whereby the movement of said switch may cause said sources of energy to be connected to said motor in multiple or series, at will, together with a pole-changer electrically connected to said spindle whereby said motor can be reversed.

2. In combination with a motor, a switch consisting of a member of non-conducting material, pivotally supported by a suitable spindle, a set of brush-contacts carried by said member and independent of said spindle, said brush-contacts being electrically connected, a second set of brush-contacts carried by said member and electrically connected with said spindle and each other, a plurality of sources of energy having their positive poles independently connected to adjacent secondary contacts and their negative poles also independently connected to adjacent secondary contacts, said secondary contacts being in proximity to said brush-contacts, means whereby movement of said switch can cause said sources of energy to be connected in multiple with said motor, and means whereby further movement of said switch can cause said sources of energy to be connected in series with said motor, together with a pole-changer electrically connected to said switch.

3. In combination with a motor, a switch consisting of a member of non-conducting material, pivotally supported by a suitable spindle, a set of brush-contacts carried by said member and independent of said spindle, said brush-contacts being electrically connected, a second set of brush-contacts carried by said member and electrically connected with said spindle and each other, a plurality of sources of energy having their positive poles independently connected to adjacent secondary contacts and their negative poles also independently connected to adjacent secondary contacts, said secondary contacts being in proximity to said brush-contacts, means whereby movement of said switch can cause said sources of energy to be connected in multiple with said motor, means whereby further movement of said switch can cause said sources of energy to be connected in series with said motor, together with a pole-changer, the spindle of said pole-changer being connected in series with said switch, and the brushes of said motor, through the arm thereof.

FREDERICK WRIGHT.

Witnesses:
 DAN HERSHFIELD,
 HASKEL CORENTHAL.